United States Patent
Taniguchi

(10) Patent No.: US 9,670,903 B2
(45) Date of Patent: Jun. 6, 2017

(54) WINDMILL DEVICE FOR POWER GENERATION AND POWER GENERATION APPARATUS

(71) Applicant: Taniguchi Shokai Co., Ltd., Okayama (JP)

(72) Inventor: Hayato Taniguchi, Okayama (JP)

(73) Assignee: TANIGUCHI SHOKAI CO., LTD., Okayama-shi (JP)

( * ) Notice: Subject to any disclaimer, the term of this patent is extended or adjusted under 35 U.S.C. 154(b) by 0 days.

(21) Appl. No.: 14/899,306

(22) PCT Filed: Feb. 23, 2015

(86) PCT No.: PCT/JP2015/055045
§ 371 (c)(1),
(2) Date: Dec. 17, 2015

(87) PCT Pub. No.: WO2016/051816
PCT Pub. Date: Apr. 7, 2016

(65) Prior Publication Data
US 2016/0298598 A1 Oct. 13, 2016

(30) Foreign Application Priority Data

Sep. 30, 2014 (JP) ................. 2014-201295

(51) Int. Cl.
*F03D 3/06* (2006.01)
*F03D 1/04* (2006.01)
(Continued)

(52) U.S. Cl.
CPC ............. *F03D 3/061* (2013.01); *F03D 1/04* (2013.01); *F03D 1/06* (2013.01); *F03D 1/0633* (2013.01);
(Continued)

(58) Field of Classification Search
CPC ... F03D 3/061; F03D 3/04; F03D 1/04; F03D 1/06; F03D 9/002; F03D 1/0675; F03D 1/0633
See application file for complete search history.

(56) References Cited

U.S. PATENT DOCUMENTS

| 4,729,716 A | 3/1988 | Schmidt |
| 7,368,828 B1 * | 5/2008 | Calhoon ................ F03D 1/025 290/44 |

(Continued)

FOREIGN PATENT DOCUMENTS

| JP | S62-282174 A | 12/1987 |
| JP | 2012-067724 A | 4/2012 |
| JP | 2013-5580 A | 1/2013 |

OTHER PUBLICATIONS

Nishizawa, et al.: "An Experimental of Horizontal-Axis Sail-wing Windmill", Proceedings of Solar/Wind Energy Association, Nov. 6, 2003, pp. 327-330, Google Translation [retrieved from <URL: https://translate.google.com/>].

*Primary Examiner* — Gregory Anderson
*Assistant Examiner* — Maxime Adjagbe
(74) *Attorney, Agent, or Firm* — Fox Rothschild LLP

(57) ABSTRACT

Provided is a windmill device including a wind tunnel member with a wind tunnel passage and a windmill held rotatably inside the wind tunnel passage of the wind tunnel member. The windmill includes a hub serving as a rotation center, plurality of spokes extending radially therefrom, an approximately annular limb connecting outer ends of the plurality of spokes, and plurality of sailcloth pieces, each sailcloth piece being approximately triangular in shape, one side of each sailcloth piece left as a free end 24a not supported by any of the spokes and the limb. A ratio $S_2/S_1$ is 0.9 or more. $S_1$ is a cross-sectional area of the wind tunnel passage. $S_2$ is a wind catching area of the plurality of sailcloth pieces.

6 Claims, 12 Drawing Sheets

(51) Int. Cl.
  *F03D 1/06*  (2006.01)
  *F03D 3/04*  (2006.01)
(52) U.S. Cl.
  CPC ............. *F03D 1/0675* (2013.01); *F03D 3/04* (2013.01); *F05B 2240/311* (2013.01); *Y02E 10/721* (2013.01); *Y02E 10/722* (2013.01)

(56) References Cited

U.S. PATENT DOCUMENTS

| | | | |
|---|---|---|---|
| 7,396,207 B2* | 7/2008 | DeLong | F03D 1/0608 415/4.3 |
| 8,596,978 B2 | 12/2013 | Garmong | |
| 2001/0004439 A1 | 6/2001 | Bolcich et al. | |
| 2008/0069696 A1* | 3/2008 | Ball | F03D 1/0666 416/132 B |
| 2011/0120108 A1 | 5/2011 | Garmong | |
| 2012/0091727 A1 | 4/2012 | Tsitron | |

* cited by examiner (a)

(b)

(a) Windmill A (d) Windmill D (g) Windmill G (b) Windmill B (e) Windmill E (h) Windmill H
*Wells turbine (c) Windmill C (f) Windmill F

WINDMILL DEVICE FOR POWER GENERATION AND POWER GENERATION APPARATUS

TECHNICAL FIELD

The present invention relates to a windmill device for power generation employing a sail-wing windmill. The present invention also relates to a power generation apparatus incorporating this windmill device.

BACKGROUND ART

A windmill whose wind-catching blades are made of sailcloth is conventionally known (e.g. a windmill of the non-patent document 1). This kind of windmill is referred to as a "sail-wing windmill", which is advantageous in that (1) the blades can be made lighter; and (2) the blades can be made more easily, compared to a propeller windmill whose blades are made of rigid materials. Since the blades are not arranged closely in the conventional sail-wing windmill, there is a shortcoming that a high energy-convertion efficiency is not obtained when generating power using it. The reason is that the conventional sail-wing windmill is used in an open environment in which nothing exists around it. If the blades are arranged closely, a resistance generated by the windmill catching a wind becomes large, and the wind hit by the windmill escapes outside thereof without passing through gaps between adjacent blades of a windmill, a rotational efficiency becomes lower than a configuration in which the blades are arranged apart. Thus, the conventional sail-wing windmill is not suitable for a practical power generation apparatus.

PRIOR ARTS

Non-Patent Documents

Non-Patent Document 1: Yoshifumi Nishizawa et al, "An Experimental of Horizontal-Axis Sail-wing Windmill", Conference Proceedings of Japan Wind Energy Association (2003), Japan Solar Energy Society, Nov. 6, 2003, pp. 327-330

SUMMARY OF INVENTION

Problems to be Solved by the Invention

An objective of the present invention is to solve the problem described above. The present invention provides a windmill device for power generation in which a rotational efficiency of the windmill is improved by having a wind pass though gaps between closely arranged blades without having the wind escape outside, and which is suitable to be incorporated in a practical power generation apparatus. The present invention also provides a power generation apparatus incorporating this windmill device.

Means to Solve the Problems

The problem above is solved by providing a windmill device for power generation. The device includes: a wind tunnel member provided with a wind tunnel passage passing a wind therethrough; and a windmill held rotatably inside the wind tunnel passage of the wind tunnel member. The windmill includes: a hub serving as a rotation center; a plurality of spokes extending radially from the hub; a limb connecting outer ends of the plurality of spokes, the limb being approximately annular in shape; and a plurality of sailcloth pieces, each sailcloth piece of the plurality of sailcloth pieces being approximately triangular in shape, each of two sides of the sailcloth piece supported by the spokes or the limb, and other one side of the sailcloth piece left as a free end not supported by any of the spokes and the limb. A ratio $S_2/S_1$ is 0.9 or more, where $S_1$ is a cross-sectional area of the wind tunnel passage; and $S_2$ is a wind catching area of the plurality of sailcloth pieces.

If a wind flows from one end side to the other end side of the wind tunnel passage, the each sailcloth piece is swollen by the wind with its free end displaced toward the other end side of the wind tunnel passage. Wind flow energy is thereby converted into rotational energy, which rotates the windmill in one direction. If a wind flows from the other end side to the one end side of the wind tunnel passage, the each sailcloth piece is swollen by the wind with its free end displaced toward the one end side of the wind tunnel passage. Wind flow energy is thereby converted into rotational energy, which rotates the windmill in the one direction. Namely, according to the windmill device for power generation of the present invention, the windmill rotates in the same direction even though a wind flows in either directions in the wind tunnel passage.

As described above, rotational efficiency of a windmill is difficult to be improved if a wind hit a windmill escape outside thereof. By covering around the windmill with the wind tunnel member, and setting a ratio of $S_2/S_1$ high i.e., 0.9 or more, most of the wind hit the windmill passes through gaps between adjacent sailcloth pieces (blades) of the windmill to the other side thereof without escaping away outside the windmill in the windmill device of the present invention. $S_1$ is a cross-sectional area of the wind tunnel passage. $S_2$ is a wind catching area of the plurality of sailcloth pieces (blades). In other words, the wind catching area is an area of the plurality of sailcloth pieces (blades) viewed from a direction parallel to a rotation shaft of the windmill. In case where the cross-sectional area varies along the length of the wind tunnel passage, $S_1$ is defined as a cross-sectional area of the wind tunnel passage at a point where the windmill is located. The ratio $S_2/S_1$ is referred to as a "cross-section blockage ratio $S_2/S_1$" hereafter. According to the windmill device of the present invention, the windmill exerts high rotational efficiency, and is capable of improving energy conversion of a power generation apparatus when incorporated therein.

In the present invention, the each sailcloth piece is needed to be supported by the spoke and the limb with some slack on the free end thereof. If the slack on the free end is too small, the sailcloth piece do not swell downwind enough when catching a wind. This may inhibit a wind force caught by the plurality of sailcloth pieces from being converted into the rotational energy of the windmill. This may make a vertical opening area of the sailcloth piece, which is described below, small, and may inhibit a wind from passing through from an upwind side of the windmill to an downwind side. This may cause a turbulent airflow on the upwind side of the windmill to negatively affect the rotational efficiency of the windmill. Therefore, the each sailcloth piece is preferred to be supported by the spoke and the limb with some slack on the free end side. Particularly, if used in somewhat high-speed wind, the slack on the free end side of the each sailcloth piece is needed to be large in order to enlarge the vertical opening area of the sailcloth piece. For example, if used in a strong wind range i.e., wind speed is 29 m/s or higher, a ratio W/L is preferred to be 0.1 or more.

W is a maximum vertical displacement of the free end edge of the sailcloth piece (blade). L is a length of the spoke. The ratio W/L is referred to as a "blade displacement ratio W/L" hereafter.

On the other hand, if the each sailcloth piece is supported by the spoke and the limb with large slack on the free end side, the sailcloth piece swells downwind too much when the windmill catches a wind to generate large air resistance when the windmill rotates. This may lower a rotational efficiency of the windmill. Therefore, it is important not to set the slack on the sailcloth piece side too large. More concretely, The blade displacement ratio W/L is preferred to be 0.3 or less. The blade displacement ratio W/L ratio is a ratio of maximum vertical displacement of the free end edge of the sailcloth piece with respect to the length of the spoke. The blade displacement ratio W/L is further preferred to be 0.25 or less, and is still further preferred to be 0.2 or less.

As illustrated in FIG. 4, W, a maximum vertical displacement of the free end edge of the sailcloth piece, is defined as a distance between a point P and a mid-plane of the windmill 20 when the point P is pulled toward one face side of the windmill 20, or in other words, a length of a line segment PP' in FIG. 4. P is a specific point which has a potential to be most largely displaced from the mid-plane of the windmill 20 on the free end edge 24a of the sailcloth piece 24. The mid-plane of the windmill 20 is defined as a plane including center lines of the spoke 22 and a midline of the limb 23. The one face side of the windmill 20 is a direction indicated by an arrow D in FIG. 4. FIG. 4 illustrates the maximum vertical displacement W of the free end edge of the sailcloth.

In the present invention, a ratio $S_3/S_1$ is not particularly limited. $S_1$ is a cross-sectional area of the wind tunnel passage. $S_3$ is a sum of vertical opening areas of sailcloth pieces. The ratio $S_3/S_1$ is referred to as a "vertical opening ratio $S_3/S_1$" hereafter. However, if the vertical opening ratio $S_3/S_1$ is too low, the same problem may occur as in a case that the slack on the free end edge of the each sailcloth piece is too small. Therefore, the vertical opening ratio $S_3/S_1$ is preferable to be 0.05 or more. The vertical opening ratio $S_3/S_1$ is further preferred to be 0.07 or more, and is still further preferred to be 0.08 or more. If a wind speed is in the strong wind range, the vertical opening ratio $S_3/S_1$ is sometimes preferred to be even higher, such as 0.1 or more.

On the other hand, if the vertical opening ratio $S_3/S_1$ is too high, the same problem may occur as in the case that the slack on the free end edge of the each sailcloth piece is too large. Therefore, the vertical opening ratio $S_3/S_1$ is preferred to be 0.3 or less. The vertical opening ratio $S_3/S_1$ is further preferred to be 0.25 or less, and is still further preferred to be 0.2 or less.

As illustrated in FIG. 4, the "vertical opening area of the sailcloth piece" is defined as an area of a triangle which is formed by the free end edge 24a of the sailcloth piece 24 and the mid-plane of the windmill 20 when the point P is pulled toward the one face side of the windmill 20. P is a specific point which has a potential to be most largely displaced from the mid-plane of the windmill 20 on the free end edge 24a of the sailcloth piece 24. In other words, a triangle whose apex is on the point P and the base is a line segment connecting two ends of the free end edge 24a. "Sum of vertical opening areas of sailcloth pieces" is defined as a sum total of the vertical opening areas of all the sailcloth pieces 24 included in the windmill 20.

In the present invention, the limb of the windmill is not particularly limited in shape as long as it is arranged approximately annularly around the windmill. The limb may be divided into segments by the spokes, namely may have an open annular shape. However, strength of the windmill may be decreased in this case. For example, each spoke rattles when the windmill catch a wind. Therefore, it is preferable that the limb has a continuous shape, namely a closed annular shape. The limb may be polygonal annular or non-toric in shape, but is preferred to be toric, with each sailcloth piece being sectoral. This makes it easier to secure a higher cross-section blockage ratio $S_2/S_1$ of the wind catching area $S_2$ of the plurality of sailcloth pieces to the cross-sectional area $S_1$ of the wind tunnel passage. This configuration is particularly preferably employed in a case where a cross-section of the wind tunnel passage of the wind tunnel member is circular in shape.

In the present invention, number of the sailcloth pieces (blades), included in the plurality of sailcloth pieces is not particularly limited, as it depends on, for example, size of the windmill. The number of the sailcloth pieces (blades), included in the plurality of sailcloth pieces sometimes referred to as "division number of the windmill" hereafter. However, if the division number of the windmill is too small; number of the gaps, in other words gaps between adjacent sailcloth pieces, through which wind hit the windmill passes becomes also small to inhibit a wind from passing through the windmill. This may cause turbulent airflow on the upwind side of the windmill, and negatively affect the rotational efficiency of the windmill. Therefore, the division number of the windmill is preferred to be four or more. The division number of the windmill is further preferred to be six or more.

On the other hand, if the division number of the windmill is too large; the number of the gaps, in other words the gaps between adjacent sailcloth pieces, through which wind hit the windmill passes becomes also large to generate many air currents on the downwind side of the windmill. These air currents may complicatedly interfere with each other to generate a turbulent airflow on the downwind side of the windmill, and negatively affect the rotational efficiency of the windmill. Therefore, the division number of the windmill is preferred to be twelve or less. The division number of the windmill is further preferred to be sixteen or less.

The problem described above is also solved by providing a power generation apparatus including: the windmill device of the present invention; and a power converter converting rotational energy of the windmill into electric power. This power generation apparatus is suitable to be used not only as a wind power generation apparatus, but also as a wave power generation apparatus which generates electricity from an air current produced by waves. Especially, the power generation apparatus of the present invention is preferably used in the wave power generation apparatus since it generates power based on a power generation principle utilizing an air current whose direction is reversed by a simple harmonic motion of the wave, in other words a water level repetitively rises and falls. This is because the windmill rotates in the same direction even though the wind flows in either direction of the wind tunnel passage, as described above.

Effects of the Invention

According to the present invention, the windmill device for power generation is provided in which a rotational efficiency of the windmill is improved by having a wind pass though gaps between closely arranged blades without having the wind escape outside, and which is suitable to be incorporated in a practical power generation apparatus. The power generation apparatus incorporating this windmill device is also provided.

DESCRIPTION OF EMBODIMENTS

Figure 1:
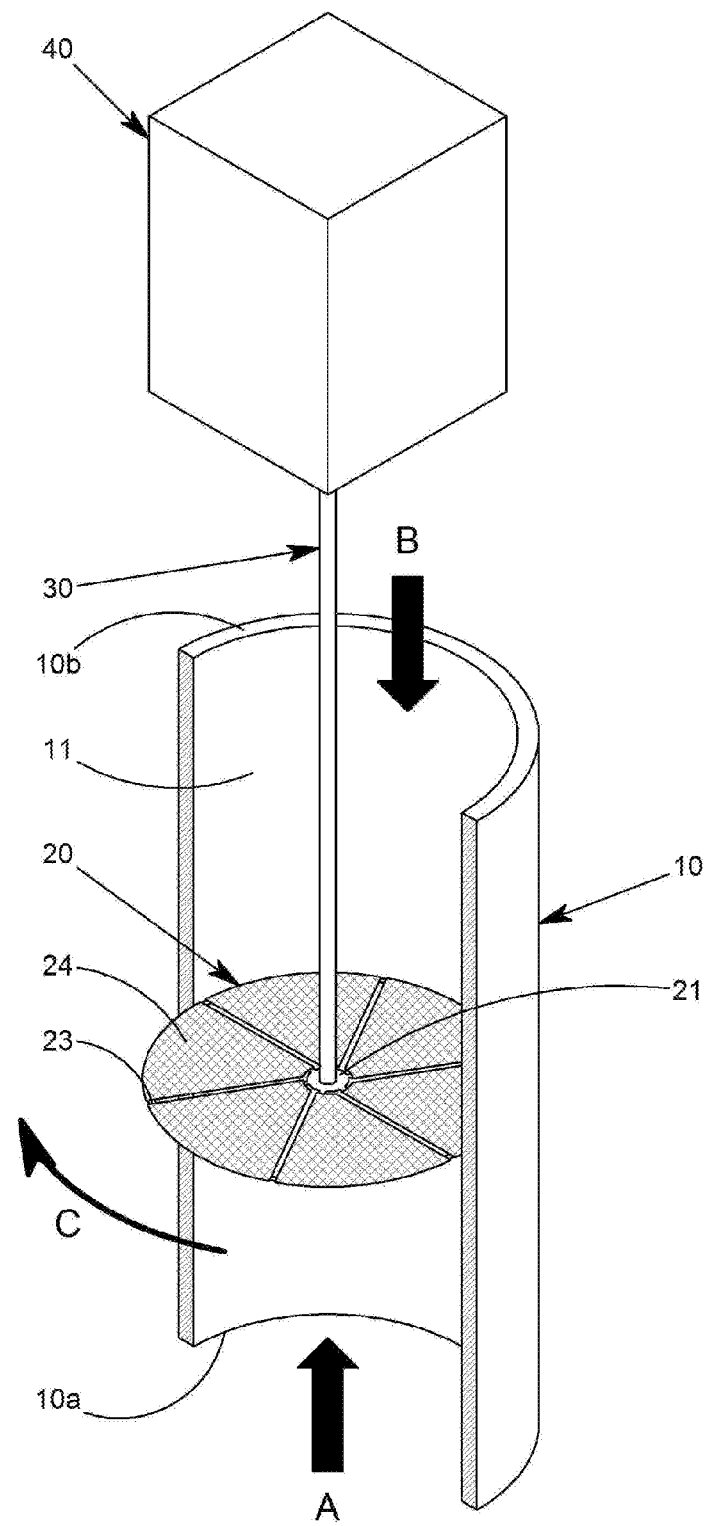
FIG. 1 is a perspective view illustrating a power generation apparatus incorporating a windmill device in which portions are broken away.
Figure 2:
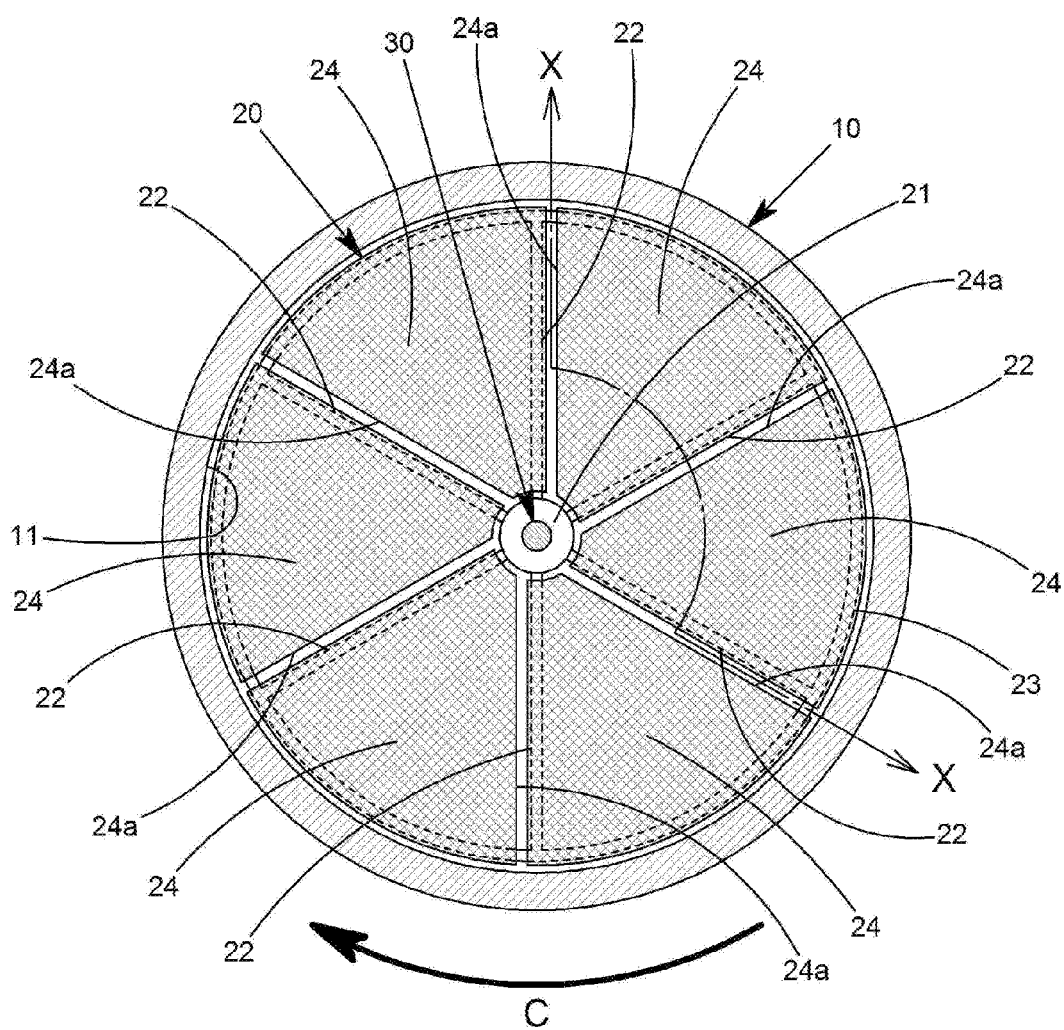
FIG. 2 illustrates the windmill device as seen from the direction parallel to a rotation shaft of a windmill.
Figure 3:
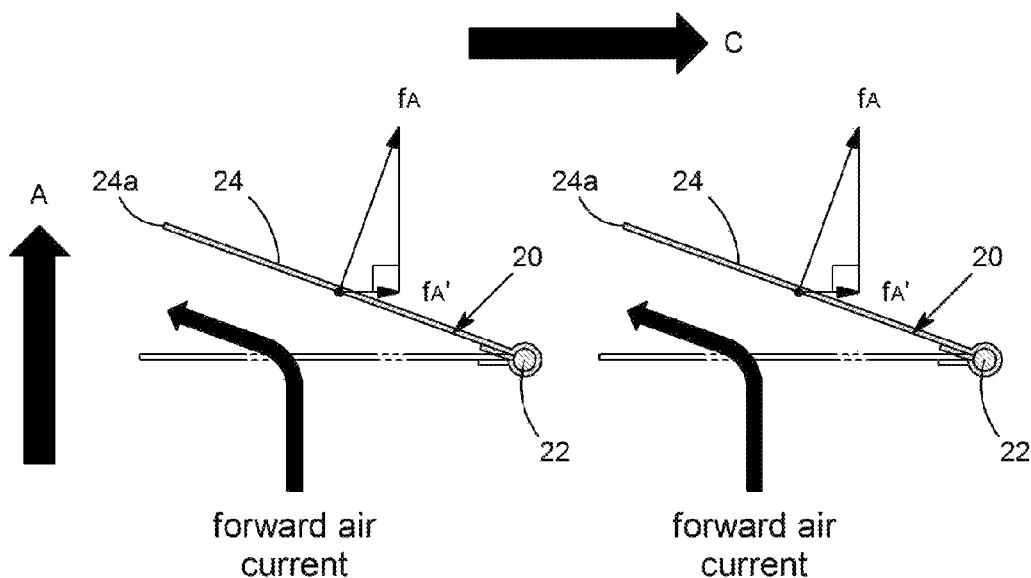
FIG. 3 is a crosssectional view illustrating the windmill of the windmill device, taken along a plane X-X of FIG. 2, illustrating sailcloth pieces of the windmill receiving a forward air current and the sailcloth pieces receiving a backward air current.
Figure 3:
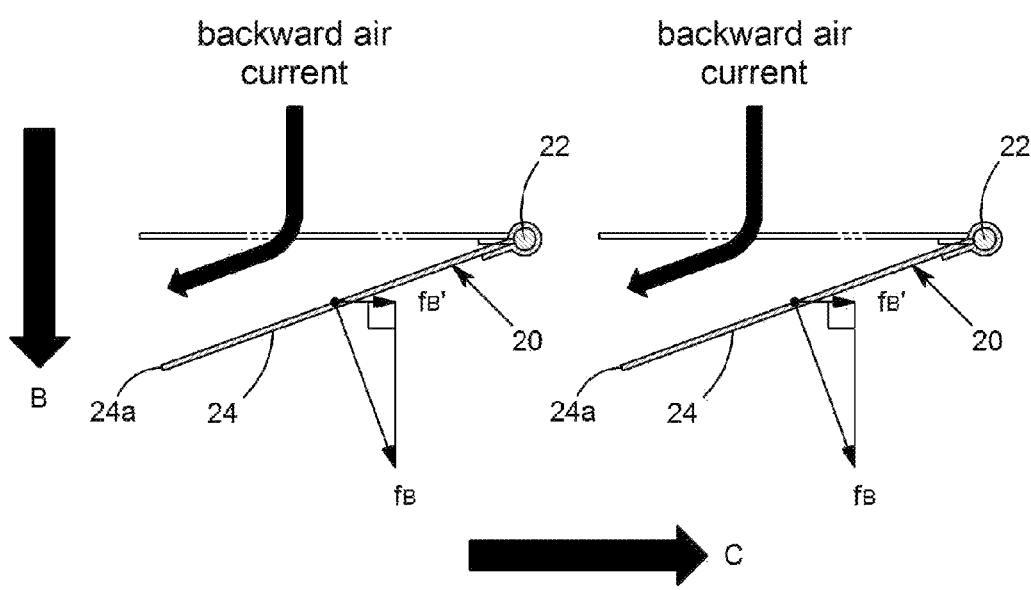

Preferred embodiments of a windmill device for power generation of the present invention and a power generation apparatus incorporating this windmill device are described in more detail with reference to Figs. FIG. 1 is a perspective view illustrating the power generation apparatus incorporating the windmill device. In FIG. 1, a wind tunnel member 10 is illustrated with portions broken away along a plane including a center line thereof. FIG. 2 is illustrating the windmill device as seen from the direction parallel to a rotation shaft, which is an output shaft 30, of a windmill 20. FIG. 3 is a sectional view illustrating the windmill 20 of the windmill device, taken along plane X-X of FIG. 2, illustrating sailcloth pieces 24 of the windmill 20 receiving a forward air current and the sailcloth pieces 24 receiving a backward air current.

As illustrated in FIG. 1, the power generation apparatus of the present embodiment includes the windmill device for power generation including the wind tunnel member 10 and the windmill 20, output shaft 30, and a power converter 40. The wind tunnel member 10 is provided with a wind tunnel passage 11 to let wind pass therethrough. The windmill 20 is held rotatably inside the wind tunnel passage 11 of the wind tunnel member 10, in such a manner that the windmill 20 rotates by catching wind flow energy if a wind passes through the wind tunnel passage 11. A central portion of the windmill 20, which is referred to as a hub 21 as described below, is fixed to one end of the output shaft 30. If the windmill 20 rotates, the output shaft 30 also rotates. A power converter 40, which converts rotational energy of the output shaft 30 into electric power, is attached to the other end of the output shaft 30. Each member included in the power generation apparatus of the present embodiment is described below in more detail.

[Wind Tunnel Member]

As illustrated in FIG. 1, the wind tunnel member 10 is a cylindrical member provided with the wind tunnel passage 11 to let wind pass therethrough. One end 10a and the other end 10b of the wind tunnel member 10 are both open. The wind tunnel passage 11 penetrates the wind tunnel member 10 from the one end 10a side thereof to the other end 10b side thereof. Therefore, if a wind blows into the wind tunnel passage member 11 from the one end 10a side of the wind tunnel member 10, that is the direction indicated by an arrow A in FIG. 1; the wind comes out from the other end 10b side of the wind tunnel member 10. If a wind blows into the wind tunnel passage 11 from the other end 10b side of the wind tunnel member 10, that is the direction indicated by an arrow B in FIG. 1; the wind comes out from the one end 10a side of the wind tunnel member 10.

In the present embodiment, inlets/outlets of the wind tunnel passage 11 are formed on the two ends 10a, 10b of the straight, cylindrical wind tunnel member 10 and opposes each other as illustrated in FIG. 1. However, it is not limited to this configuration. For example, inlets/outlets may be provided on peripheral wall of the wind tunnel member 10. Alternatively, the wind tunnel member 10 may be bent or folded in shape, and the inlets/outlets of the wind tunnel member 10 may be provided on both end of the wind tunnel member 10 or peripheral walls near both ends of the wind tunnel member 10. Particularly, in many cases, apparatuses such as the power converter 40 and others are often provided on a side. In FIG. 1, the side of the wind tunnel member 10 from which the output shaft 30 extends is on the other end portion 10b of the wind tunnel member 10. Since these apparatuses might prevent wind from blowing into or coming out of the wind tunnel passage 11, the inlets/outlets of the wind tunnel passage member 11 on an apparatus side are preferred to be placed at a position not opposing these apparatuses as the power converter 40. For example, it is preferred to employ a configuration of illustrated in FIG. 5 omitting a resistor and replacing a rotational output measurement device 60 with the power converter 40. The resistor is a test device used in Experiment 1 described below. In the wind tunnel member 10, as illustrated in FIG.

5, the outlet/inlet of the wind tunnel passage 11 projects from the peripheral wall on the other end 10*b* side. Another configuration may be employed, in which the wind tunnel member 10 is not made narrow by the power converter 40, a compactly designed power converter 40 is arranging inside the wind tunnel member 10, a diameter of the wind tunnel member 10 is enlarged at a portion where the power converter 40 is placed.

Although a cross-sectional shape of the wind tunnel passage 11 of the wind tunnel member 10 is not particularly limited, it is preferred to be circular to secure a higher cross-section blockage ratio $S_2/S_1$, as already described. In the present embodiment, wind tunnel member 10 has a straight and cylindrical shape. The cross-section of the wind tunnel passage 11 is a circular shape in which the same shape and the dimension continues from the one end 10*a* side to the other end 10*b* side thereof. However, shape and dimension of the cross-section of the wind tunnel passage 11 are not necessary to be uniform throughout the wind tunnel member 10 from the one end 10*a* side to the other end 10*b* side thereof, but may vary depending on a position of the wind tunnel member 10. For example, the cross-section of the wind tunnel passage 11 may be circular only around a position where the windmill 20 is arranged, and non-circular in other positions. Alternatively, the wind tunnel member 10 may be tapered on the one end 10*a* side or the other end 10*b* side to facilitate a wind to gather around the windmill 20.

Although a material of the wind tunnel member 10 is not limited as long as it secures necessary strength to be a wind tunnel member, the wind tunnel member 10 is typically made of metals such as iron or stainless steel, or high-strength plastic such as reinforced plastic. Surface of the wind tunnel member 10 may be subjected to appropriate kinds of treatment, such as anti-corrosion treatment, depending on an environment where the power generation apparatus is used.

[Windmill]

As illustrated in FIG. 2, the windmill 20 includes the hub 21 serving as its rotation center, a plurality of spokes 22 extending radially from the hub 21, a limb 23 connecting outer ends of the plurality of spokes 22, the limb 23 being approximately annular in shape, and a plurality of sailcloth pieces 24 stretches between the plurality of spokes 22 and the limb 23. Each of two sides of the each sailcloth piece 24 is a fixed end edge supported by one of the spokes 22 or the limb 23. Other one side of the each sailcloth piece 24 is left as a free end 24*a* which is not supported by any of the spokes 22 and the limb 23. Each sailcloth piece 24 is approximately triangular in shape when seen from the direction parallel to the rotation shaft (the output shaft 30) of the windmill 20.

The hub 21 serves as the rotation center of the windmill 20. The output shaft 30 is fixed to a center portion of the hub 21. Although a shape of the hub 21 is not particularly limited, a shape of the hub 21 in the present embodiment is a disc shape with a thickness of 1.3 mm and a diameter of 10 mm. Although the hub 21 is not limited in material as long as it secures necessary strength, the hub 21 is typically made of metals such as iron or stainless steel, high-strength plastic such as reinforced plastic or wood, or others. In the present embodiment, the hub 21 is made of iron. Surface of the hub 21 may be subjected to appropriate kinds of treatment, such as anti-corrosion treatment.

The each spoke 22 is provided to support one side of the each sailcloth piece 24, and to connect the hub 21 and the limb 23. Although a shape of the spoke 22 is typically straight, and that of the spoke 22 is straight too in the present embodiment; the spoke 22 may also be curved or folded as far as the cross-section blockage ratio $S_2/S_1$ is not severely decreased. Although the spoke 22 is not limited in material as long as they secure necessary strength, the spoke 22 is typically made of metals such as iron or stainless steel, high-strength plastic such as reinforced plastic or wood or others. In the present embodiment, the spokes 22 is made of iron. Surface of the spoke 22 may be subjected to appropriate kinds of treatment, such as anti-corrosion treatment. Number of spokes 22 is typically the same as number of the sailcloth pieces 24. The number of the sailcloth is the division number of the windmill 20.

The limb 23 is provided to support one of the sides (an outer edge) of the each sailcloth piece 24. Although the limb 23 may be polygonal in shape, it is preferred to be circular to make a cross-section blockage ratio $S_2/S_1$ as high as possible. In the present embodiment, the limb 23 is circular (toric) in shape. Although the limb 23 may be divided into segments, for example, a shape divided into segments by the spokes 22 as described above; the limb 23 has a continuous shape in the present embodiment, namely a closed annular shape, to increase strength of the windmill 20. Although the limb 23 is not limited in material as long as it secures necessary strength, the limb 23 is typically made of metals such as iron or stainless steel, high-strength plastic such as reinforced plastic, wood or others. In the present embodiment, the limb 23 is made of iron. Surface of the limb 23 may be subjected to appropriate kinds of treatment, such as anti-corrosion treatment.

Although the hub 21, the spokes 22 and the limb 23 described above may be made independently and combined each other, they are preferred to be integrally made. This enables to increase strength of a frame including of the hub 21, the spokes 22 and the limb 23, and reduce production cost of the frame. In the present embodiment, the frame composed of the hub 21, the spokes 22 and the limb 23 is integrally carved out from a 1.3 mm-thick iron plate, for example, by laser processing.

The sailcloth pieces 24 are members to catch wind that flows inside the wind tunnel passage 11 of the wind tunnel member 10. In the present embodiment, the each sailcloth piece 24 is sectoral (approximately triangular), in shape. The each sailcloth piece 24 is stretched between the spokes 22 and the limb 23 in such a manner to fill space of the windmill 20 comparted by the limb 23 and the adjacent spokes 22. The other side of the each sailcloth piece 24 (the free end 24*a*) is not supported by any of the spokes 22 and the limb 23, and is stretched with a slight slack made thereon. Therefore, the each sailcloth piece 24 swells downwind on the free end 24*a* side thereof when it catches a wind. Way of fixing the sailcloth pieces 24 to the spokes 22 and the limb 23 is not particularly limited. It may be sewing, clamping, gluing, bolting, nailing or combination of these.

The cross-section blockage ratio $S_2/S_1$ is set to be 0.9 or more, which is a ratio of the wind catching area $S_2$ of the plurality of sailcloth pieces (blades) to the cross-sectional area $S_1$ of the wind tunnel passage. The cross-section blockage ratio $S_2/S_1$ is preferred to be 0.93 or more, and further preferred to be 0.95 or more. In the present embodiment, cross-section blockage ratio $S_2/S_1$ is set to 0.96. The cross-section blockage ratio $S_2/S_1$ may be further increased to, for example, 0.97 or more, or 0.98 or more. However, if the cross-section blockage ratio $S_2/S_1$ is too high, a diameter of the windmill 20 is inevitably become too close to a diameter of the wind tunnel passage 11 of the wind tunnel member 10. This might cause the windmill 20 to come into contact with the wind tunnel member 10. Therefore, the cross-section blockage ratio $S_2/S_1$ is preferred to be 0.99 or less.

Figure 4:
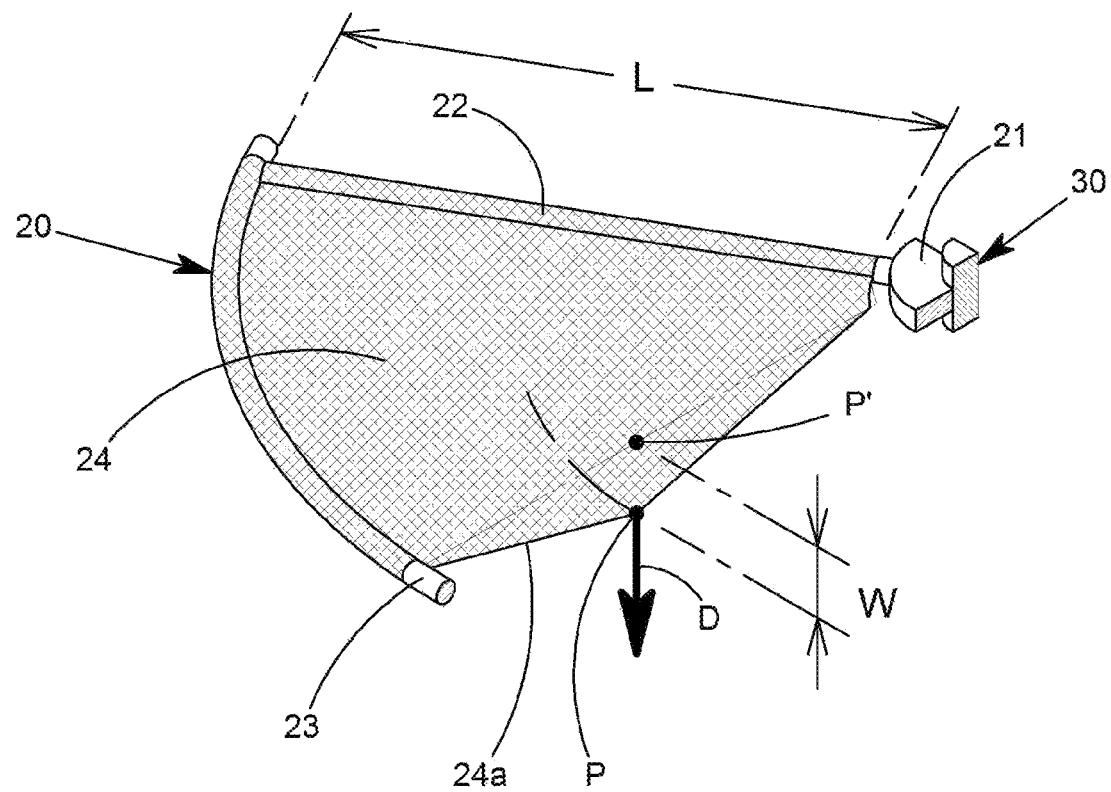
FIG. 4 explains a maximum vertical displacement W of a free end edge of the sailcloth of the windmill.

Although the blade displacement ratio W/L (see FIG. 4) is not particularly limited in value, it is preferred to be 0.3 or less, further preferred to be 0.25 or less, and still further preferred to be 0.2 or less. This is because, as already described, if the blade displacement ratio W/L is too high, the rotational efficiency of the windmill 20 may be decreased. Although lower limit of the blade displacement ratio W/L is not particularly limited, the blade displacement ratio W/L is preferred to be 0.1 or more when used in high-speed wind, i.e. at a wind speed of 29 m/s or higher, for example. This is because, as already described, if the blade displacement ratio W/L is too low under high wind speed conditions, the rotational efficiency of the windmill 20 may be decreased. In the present embodiment, the blade displacement ratio W/L is set to be approximately 0.08 to 0.2. Although the vertical opening ratio $S_3/S_1$ is not also particularly limited in value, it is preferred to be 0.05 to 0.3, further preferred to be 0.07 to 0.25, and still further preferred to be 0.1 to 0.2. This is because, as already described, if the vertical opening ratio $S_3/S_1$ is too high or too low, the rotational efficiency of the windmill 20 may be decreased as with the blade displacement ratio W/L. In the present embodiment, the vertical opening ratio $S_3/S_1$ is set to be approximately 0.05 to 0.2.

A material of the sailcloth piece 24 is not particularly limited as long as it has a flexibility, and is able to swell downwind as described above. The sailcloth piece 24 therefore may be made of an appropriate kind of sheet, such as a plastic sheet, a fabric or a metal film. The sailcloth piece 24 is preferred to be strong to some extent because it is not enough durable to use in long term if it is not sufficiently strong. In addition, conditions such as workability, lightness of weight, corrosion resistance and purchase cost are also important for a material of the sailcloth pieces 24. One example of a material that meets these requirements is a plastic sheet. Particularly, a fabric such as so-called tarpaulin, which is a waterproof fabric woven from plastic fibers and coated with plastic, is preferred because it has a superior strength. Alternatively, some materials other than plastic sheets, such as a fabric woven from carbon fibers, are also preferred because it has a superior strength. Material for the sailcloth pieces 24 is to be appropriately chosen in consideration of, for example, an exchange frequency. In the present embodiment, the sailcloth pieces 24 are made of tarpaulin woven from polyester fibers and coated with vinyl chloride.

In the present embodiment, the number of the sailcloth pieces 24 (the division number of the windmill 20) is set to be six. However, the number of the sailcloth pieces 24 may be varied as in "windmill A", "windmill B", "windmill C", "windmill D" and "windmill E" (see FIG. 6) described below. In consideration of producibility and rotational efficiency of the windmill 20, the number of the sailcloth pieces 24 (the division number of the windmill 20) is preferred to be four to twelve, and further preferred to be six to eight.

In the present embodiment, the each sailcloth piece 24 has an opening angle; which is an angle between the free end 24a and one side of the sailcloth piece 24 supported by the spoke 22, the same applies hereafter; of just under 60 degrees. In the present embodiment, all of the opening angle are uniform. However, the opening angles of the sailcloth pieces 24 are not necessarily the same with each other. The angle may be varied from one sailcloth piece 24 to another. However, the sailcloth pieces 24 are preferred to be arranged with as high rotational symmetry as possible to ensure stable rotation of the windmill 20. For example, alternately arranging the sailcloth piece 24 with the opening angle of just under 30 degrees and the sailcloth piece 24 with the opening angle of just under 60 degrees.

The windmill 20 described above always rotates in the same direction irrespective of the side on which wind is caught. More specifically, if the each sailcloth piece 24 receives an air current (a wind) of a forward direction A, as illustrated in FIG. 3 (a), the free end 24a side of the sailcloth piece 24 is pushed by a wind pressure $f_A$ and is displaced toward the forward direction A. If the each sailcloth piece 24 receives an air current (a wind) of a backward direction B, as illustrated in FIG. 3 (b), the free end 24a side of the sailcloth piece 24 is pushed by a wind pressure $f_B$ and is displaced toward the backward direction B. In other words, a tilt direction of each sailcloth piece 24, which means a direction of tilting with respect to a rotational plane thereof, is reversed if a direction of a wind pressure received on the each sailcloth piece 24 is reversed. Therefore, both components $f_A'$ and $f_B'$ have the same direction as the arrow C. $f_A'$ is a component of the wind pressure $f_A$ parallel to the rotational plane when the each sailcloth piece 24 receives the forward wind pressure $f_A$. $f_B'$ is a component of the wind pressure $f_B$ parallel to the rotational plane when the each sailcloth piece 24 receives the backward wind pressure $f_B$. The sailcloth pieces 24 (blades) move in the direction of the arrow C in both cases of FIG. 3 (a) and FIG. 3 (b). Namely, the windmill 20 keeps on rotating in the same direction of the arrow C even when the direction of the wind pressure received thereon is reversed.

[Output Shaft]

The output shaft 30, which is the rotation shaft of the windmill 20, is fixed to the rotation center of the windmill 20, which is the center of the hub 21, on the one end side thereof, and is connected to the power converter 40 on the other end side thereof. The output shaft 30 is provided to transmit the rotational force of the windmill 20 rotating by receiving a wind to the power converter 40, which is described below. The output shaft 30 may be positioned off the center line of the wind tunnel passage 11 of the wind tunnel member 10, or in a state that tilted with respect to the center line of the wind tunnel passage 11. However, the output shaft 30 is preferred to be positioned with its center line overlapped with the center line of the wind tunnel passage 11 to secure as high cross-section blockage ratio $S_2/S_1$ as possible.

Although the windmill 20 and the power converter 40 are connected to each other directly by a single output shaft 30 in the present embodiment, they are connected to each other indirectly via a transmission mechanisms such as gears, or linkage mechanisms in such a case that the power converter 40 is not be able to be positioned on an line extended from the center line of the wind tunnel passage 11 due to some reasons such as restrictions on the layout of the power converter 40. However, number of the transmission mechanisms is preferred to be as small as possible, since an energy loss becomes large if the number of the transmission mechanisms becomes large.

[Power Converter]

The power converter 40 is not particularly limited in type as long as it converts the rotational energy of the windmill 20 (the output shaft 30) into electric power. Therefore, various kinds of power generators may be employed as the power converter 40.

[Application]

The power generation apparatus of the present embodiment described above is usable as a various kinds of power generation apparatus, from a small power generation apparatus with smaller energy production to a large power generation apparatus with larger energy production. The power generation apparatus of the present embodiment preferably used not only as a wind power generation apparatus, but also as a wave power generation apparatus which generates electricity from an air current produced by waves. The power generation apparatus of the present embodiment is suitable to be used as a wave power generation apparatus because the windmill 20 rotates in one direction irrespective of a wind flow direction inside the wind tunnel passage 11. Among them, the power generation apparatus is suitable to be used as an OWC (Oscillating Water Column) wave power generation apparatus, in which an air current is generated by supplying a rising and falling wave into an air compression chamber (the wind tunnel passage 11 of the wind tunnel member 10) and the windmill 20 is rotated by the generated air current.

EXPERIMENT 1

Figure 5:
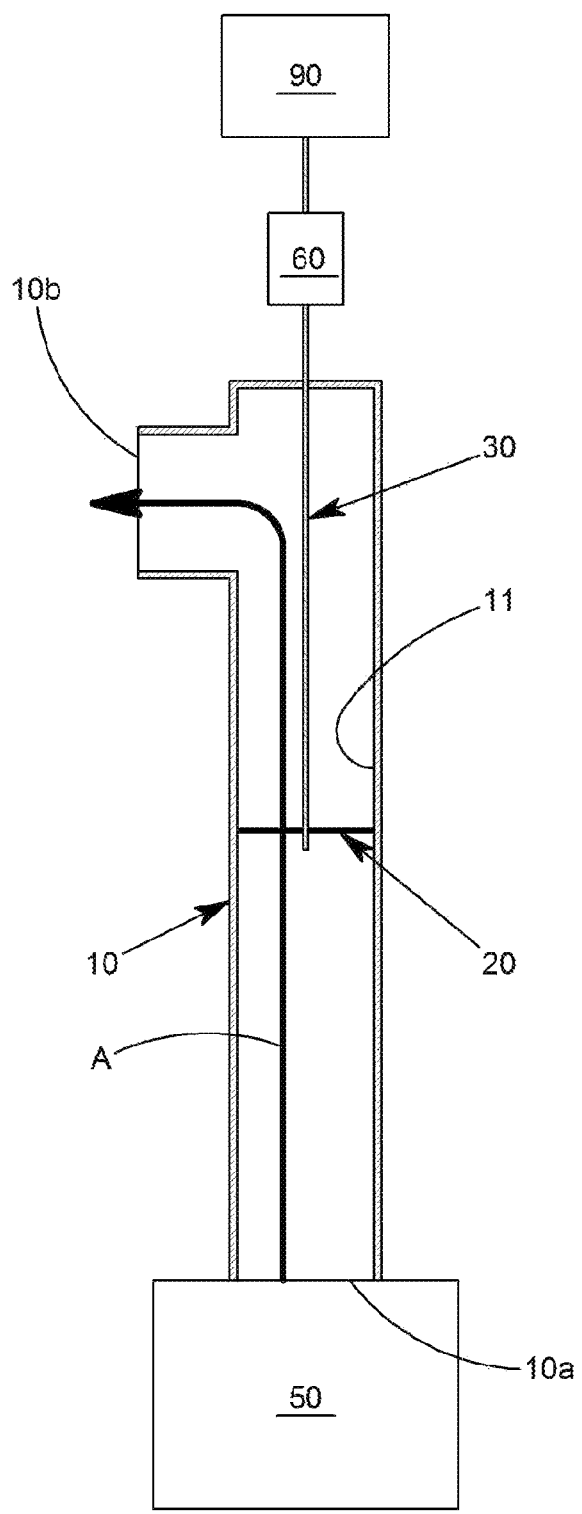
FIG. 5 illustrates a test device used in Experiment 1.

Experiment 1 described below was conducted using the test device illustrated in FIG. 5 to verify rotational efficiency of the windmill device concerning the present invention. FIG. 5 illustrates the test device used in the Experiment 1. The test device illustrated in FIG. 5 employs a windmill device for power generation including a wind tunnel member 10 and a windmill 20 held rotatably at approximate midpoint of a wind tunnel passage of the wind tunnel member 10. One end of an output shaft 30 is fixed to a central portion of the windmill 20. A rotational output measurement device 60 and a resistor 90 are attached to the other end of the output shaft 30. The rotational output measurement device 60 (a torque meter), is provided to measure a rotational torque and a rotational frequency of the output shaft 30. The resistor 90 is provided to apply a rotational resistance on the output shaft 30. The wind tunnel member 10 is a cylindrical shape with both ends open. The wind tunnel passage of the wind tunnel member 10 is circular in cross-section with a diameter of 100 mm. An opening on other end 10b side of the wind tunnel member 10 is provided on a peripheral wall of the wind tunnel member 10. One end 10a of the wind tunnel 10 is connected to an air supply port of a blower 50. In the blower 50, an amount of air supply is controlled by an inverter. Wind blown out of the blower 50 is charged into the wind tunnel member 10 from the one end 10a of the wind tunnel member 10, and discharged from the other end 10b of the wind tunnel member 10.

Figure 6:
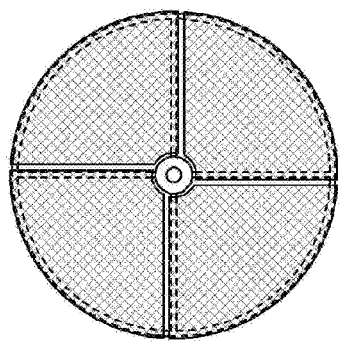
FIG. 6 illustrates windmills type A to H, which are used as samples in Experiment 1.
Figure 6:
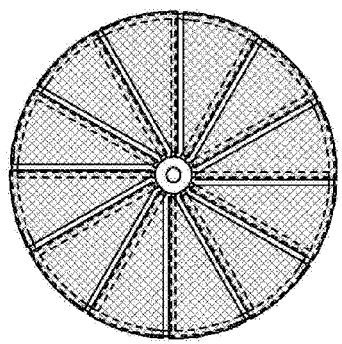
Figure 6:
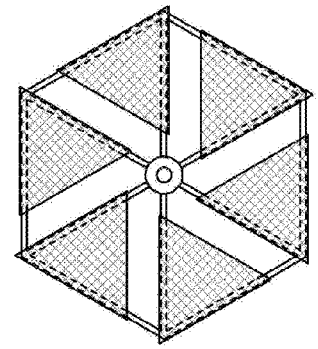
Figure 6:
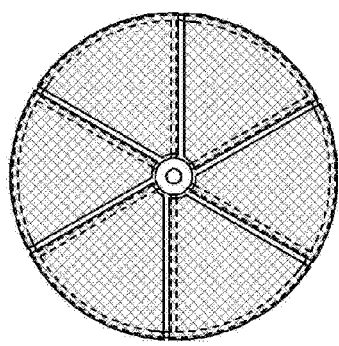
Figure 6:
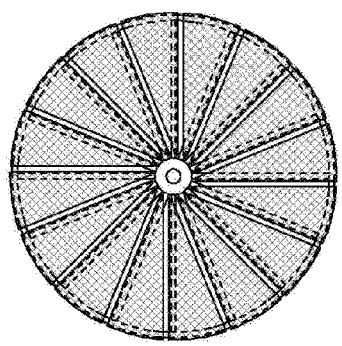
Figure 6:
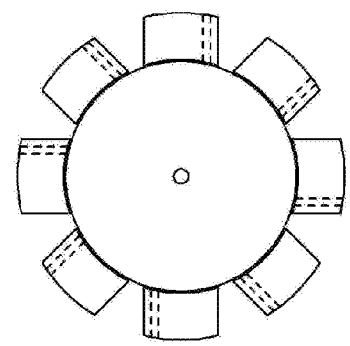
Figure 6:
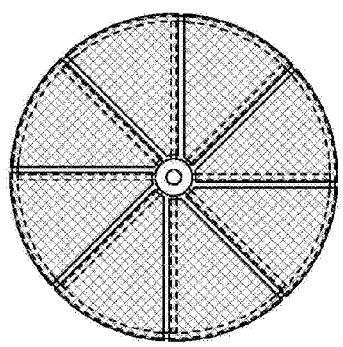
Figure 6:
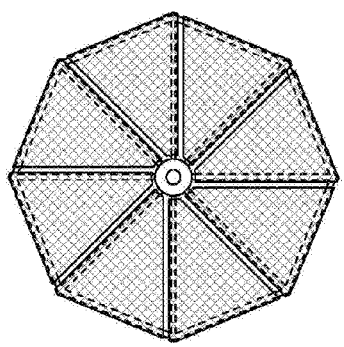
Figure 7:
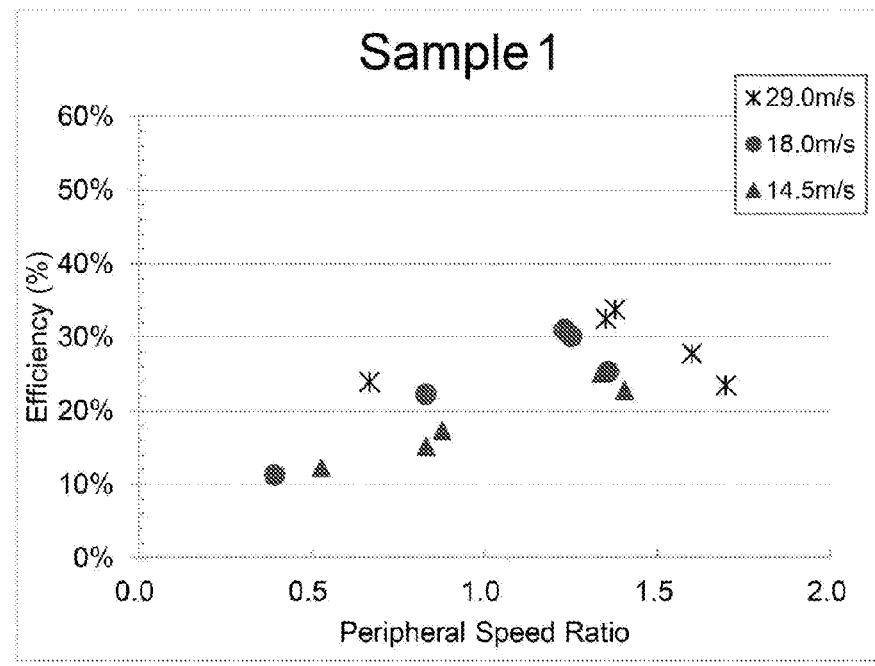
FIG. 7 is a graph showing relationship between efficiency and a peripheral speed ratio of Sample 1 measured in Experiment 1.
Figure 8:
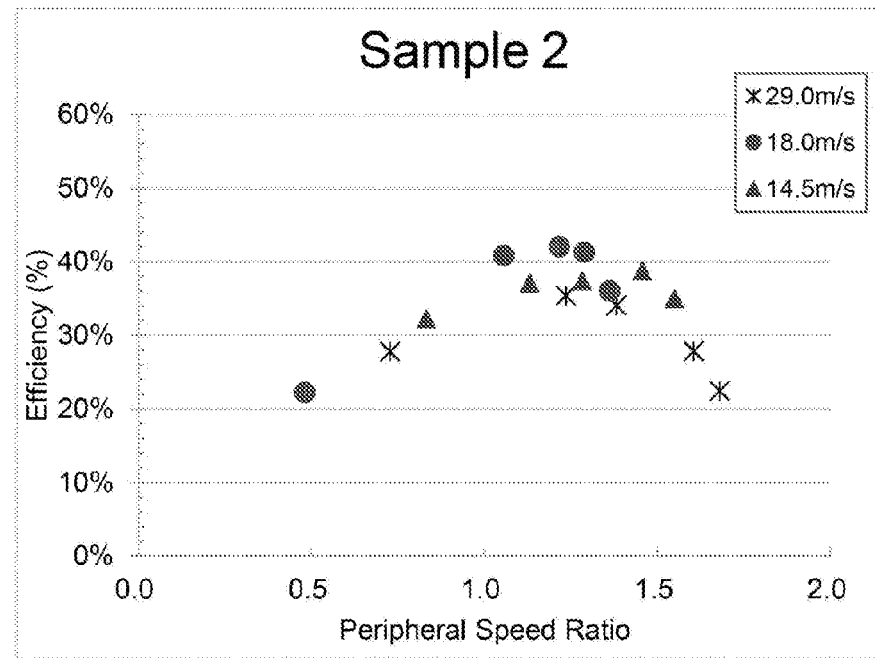
FIG. 8 is a graph showing relationship between efficiency and a peripheral speed ratio of Sample 2 measured in the Experiment 1.
Figure 9:
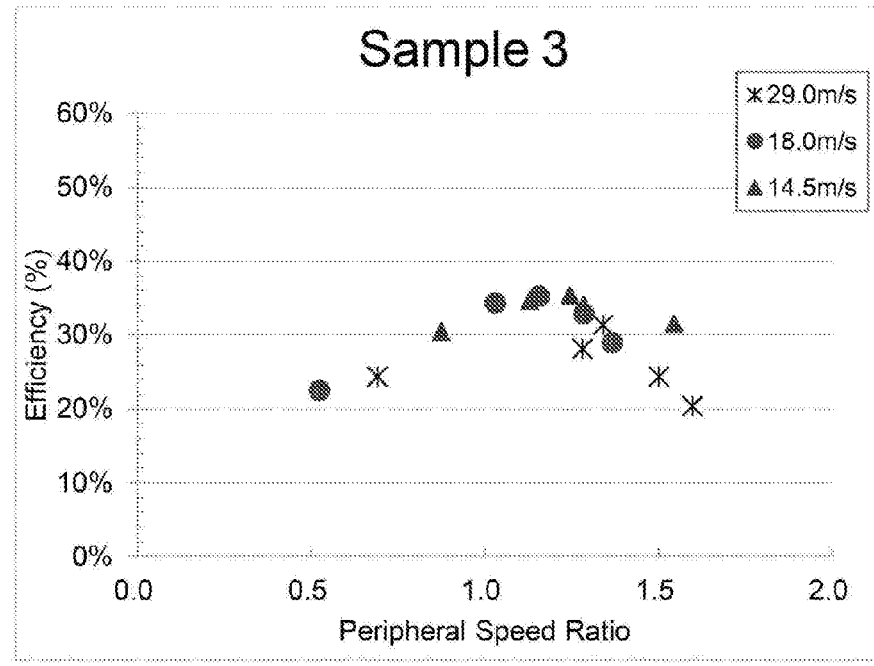
FIG. 9 is a graph showing relationship between efficiency and a peripheral speed ratio of Sample 3 measured in Experiment 1.
Figure 10:
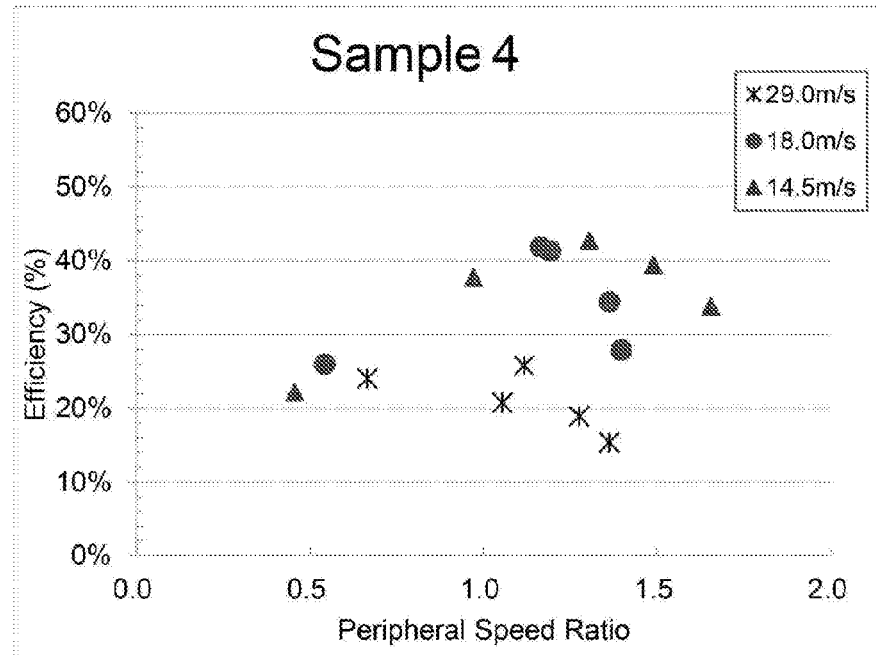
FIG. 10 is a graph showing relationship between efficiency and a peripheral speed ratio of Sample 4 measured in Experiment 1.
Figure 11:
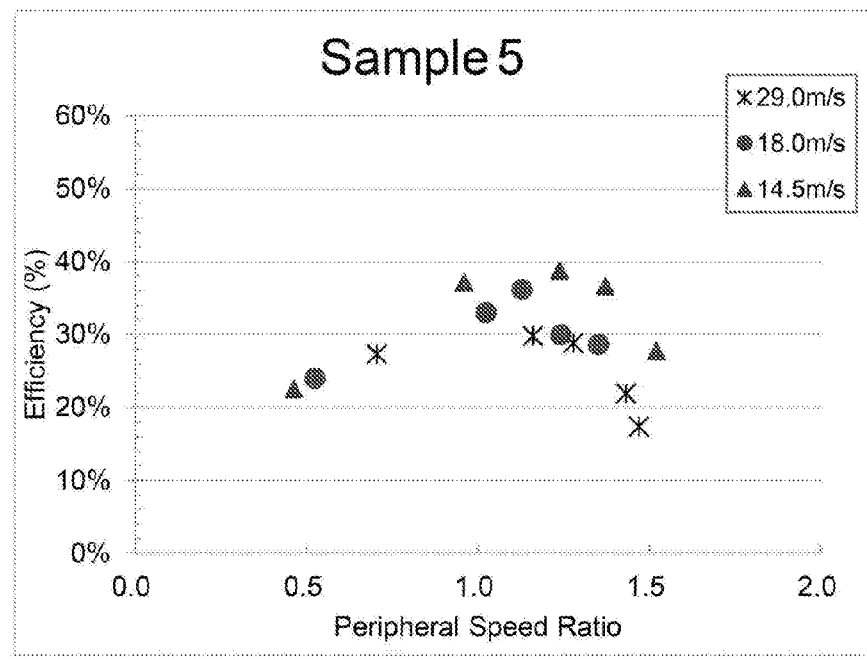
FIG. 11 is a graph showing relationship between efficiency and a peripheral speed ratio of Sample 5 measured in Experiment 1.

In the test device, air current (wind) is generated inside the wind tunnel member 10 by driving a blower 50 to rotate the windmill 20. A rotational torque of the output shaft 30 is measured with the torque meter 60. Wind speeds in the wind tunnel passage of the wind tunnel member 10 were varied in three way, i.e, wind speeds of 14.5 m/s, 18.0 m/s and 29.0 m/s. Wind speeds in the wind tunnel passage were values preliminarily measured in a state that the mill 20 was not installed inside the wind tunnel passage. As for the windmill 20 installed inside the wind mill passage, twelve kinds of Samples 1 to 12, which are described in Table 1 below, were tested. "Windmill A", "windmill B", "windmill C", "windmill D", "windmill E", "windmill F", "windmill G" and "windmill H" in the Table 1 are illustrated in FIG. 6. FIG. 6 illustrates windmills type A to H, which were used as samples in Experiment 1. Among the windmills A to H, the windmills A to G have the blades made of sailcloth, namely a sail-wing windmill. The windmill H is a Wells turbine in which plural solid blades are arranged around a periphery of a rotation drum.

Among the windmills A to H, the windmills A to G, which are sail wing windmills, include a hub, spokes and a rim which are the same in material and dimension as that of the windmill 20 of the power generation apparatus of the embodiment described above; and include the sailcloth pieces are made of the same material as that of the windmill 20 of the power generation apparatus of the embodiment described above. The windmill H, which is a Wells turbine, is made of ABS plastic. In the windmill H, an outer diameter of the windmill is 98 mm, a diameter of a hub is 68 mm, a chip (blade):hub ratio is 29:71, number of blades is eight, a cross-sectional shape of the chip (blade) is "NACA0021", an aspect ratio of the chip (blade) is 0.61, and a solidity of the chip (blade) is 0.71.

TABLE 1

| | Windmill Type | Cross-section Blockage Ratio $S_2/S_1$ | Blade Displacement Ratio W/L | Vertical Opening Ratio $S_3/S_1$ |
|---|---|---|---|---|
| Sample 1 | Windmill A (circular with division number of 4) | 0.96 | 0.11 | 0.06 |
| Sample 2 | Windmill B (circular with division number of 6) | 0.96 | 0.11 | 0.09 |
| Sample 3 | Windmill B (circular with division number of 6) | 0.96 | 0.15 | 0.11 |
| Sample 4 | Windmill C (circular with division number of 8) | 0.96 | 0.08 | 0.08 |
| Sample 5 | Windmill C (circular with division number of 8) | 0.96 | 0.10 | 0.11 |
| Sample 6 | Windmill C (circular with division number of 8) | 0.96 | 0.18 | 0.19 |
| Sample 7 | Windmill C (circular with division number of 8) | 0.96 | 0.27 | 0.28 |
| Sample 8 | Windmill D (circular with division number of 12) | 0.96 | 0.11 | 0.18 |
| Sample 9 | Windmill E (circular with division number of 16) | 0.96 | 0.07 | 0.14 |
| Sample 10 | Windmill F (octagonal with division number of 8) | 0.83 | 0.18 | 0.25 |
| Sample 11 | Windmill G (hexagonal with division number of 6 *with larger aperture area) | 0.55 | — | — |
| Sample 12 | Windmill H (Wells turbine) | — | — | — |

In the Experiment 1 described above, results shown in graphs in FIGS. 7 to 18 were respectively obtained from Samples 1 to 12. FIGS. 7 to 18 are graphs respectively showing relationship between efficiency and a peripheral speed ratio of Samples 1 to 12. A "peripheral speed ratio" on the horizontal axis in the graphs in FIGS. 7 to 18 is a ratio of a peripheral speed of a windmill to the wind speed inside the wind tunnel passage. A "peripheral speed of a windmill" is defined as a travel distance of a specific point on a periphery of a windmill per unit time. "Efficiency" on the vertical axis in the graphs in FIGS. 7 to 18 is an output value divided by energy of wind flowing inside the wind tunnel passage. The output value is acquired from a rotational torque and a rotational frequency both measured by the rotational output measurement device 60.

Firstly, to examine effects of the cross-section blockage ratio $S_2/S_1$ on the efficiency of the sail-wing windmills whose blades are made of sailcloth, the measured results of Sample 6 whose cross-section blockage ratio $S_2/S_1$ is 0.96 (shown in FIG. 12), Sample 10 whose cross-section blockage ratio $S_2/S_1$ is 0.83 (shown in FIG. 16) and Sample 11 whose cross-section blockage ratio $S_2/S_1$ is 0.55 (shown in FIG. 17) were compared. All of Samples 6, 10 and 11 are the sail-wing windmills whose blades are made of sailcloth.

Figure 12:
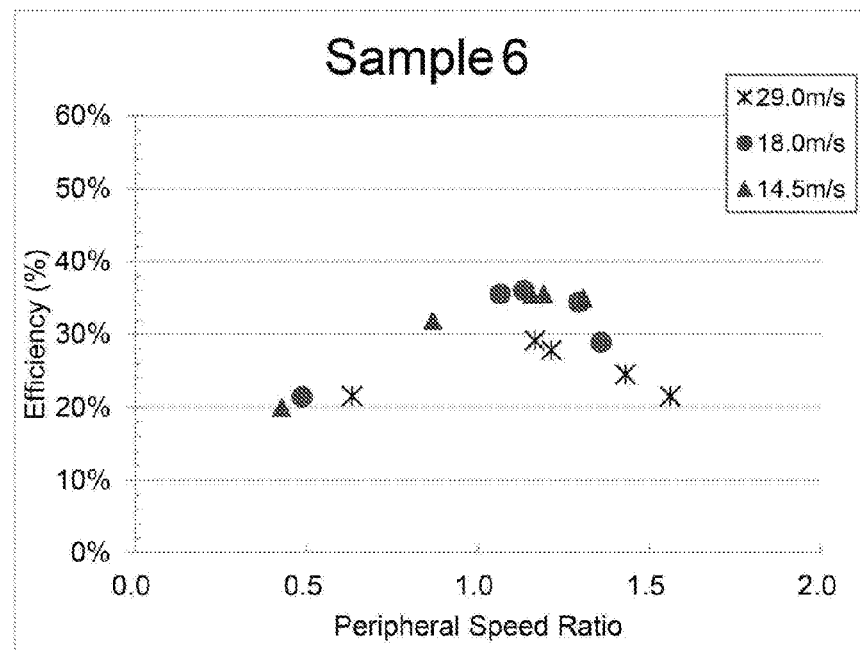
FIG. 12 is a graph showing relationship between efficiency and a peripheral speed ratio of Sample 6 measured in the Experiment 1.
Figure 13:
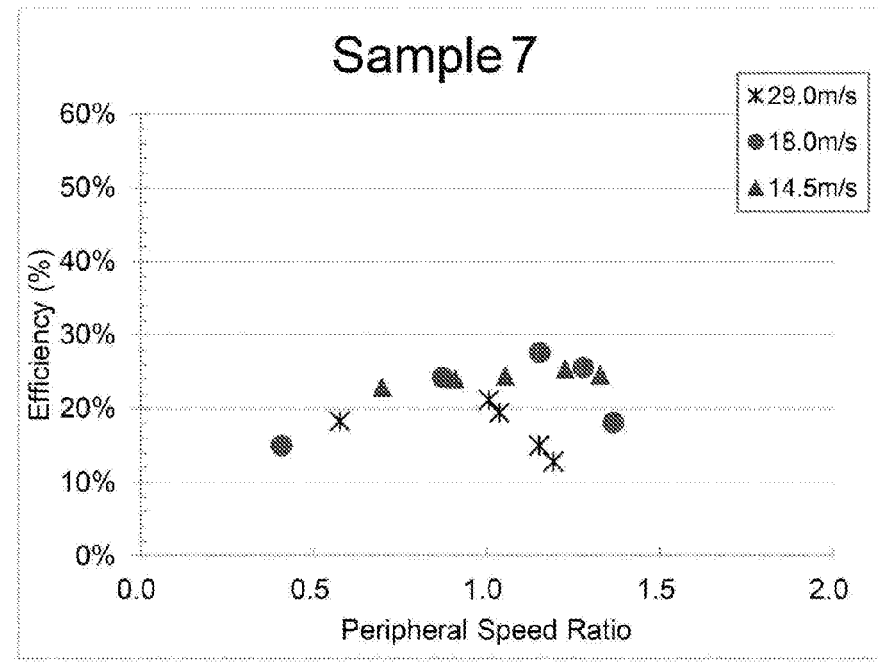
FIG. 13 is a graph showing relationship between efficiency and a peripheral speed ratio of Sample 7 measured in the Experiment 1.
Figure 14:
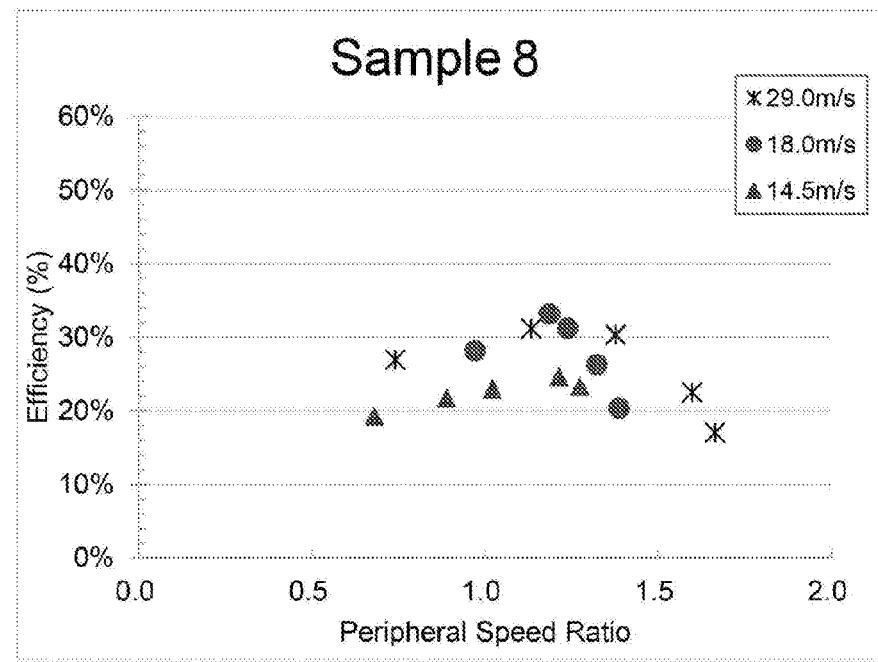
FIG. 14 is a graph showing relationship between efficiency and a peripheral speed ratio of Sample 8 measured in the Experiment 1.
Figure 15:
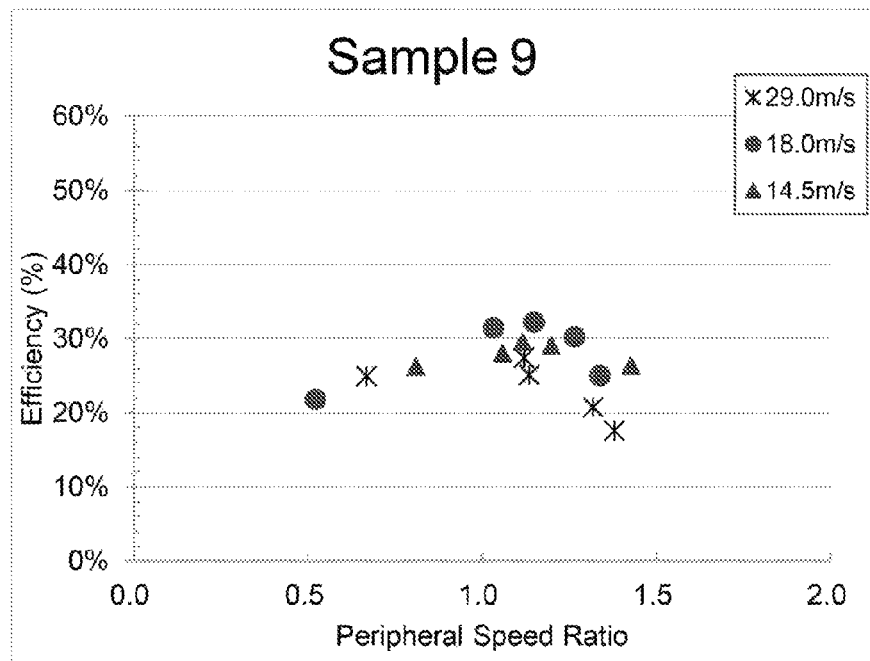
FIG. 15 is a graph showing relationship between efficiency and a peripheral speed ratio of Sample 9 measured in the Experiment 1.
Figure 16:
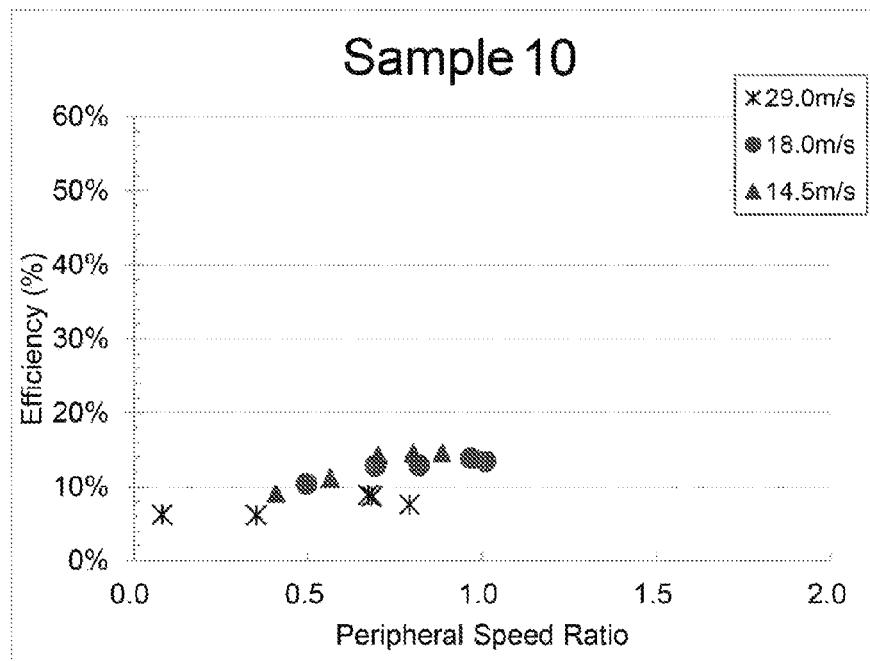
FIG. 16 is a graph showing relationship between efficiency and a peripheral speed ratio of Sample 10 measured in the Experiment 1.
Figure 17:
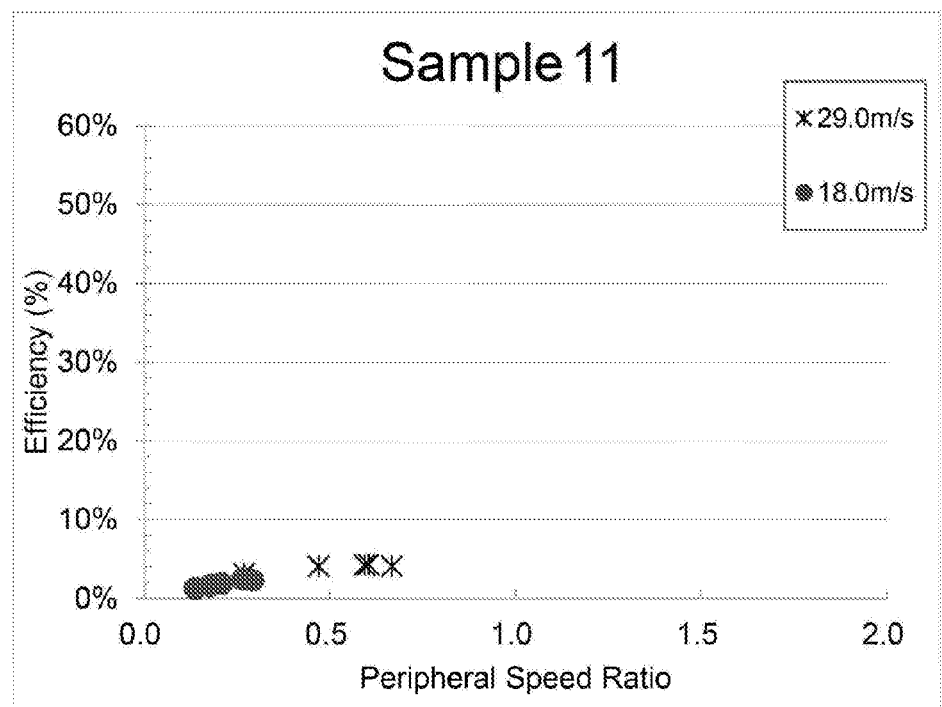
FIG. 17 is a graph showing relationship between efficiency and a peripheral speed ratio of Sample 11 measured in the Experiment 1.
Figure 18:
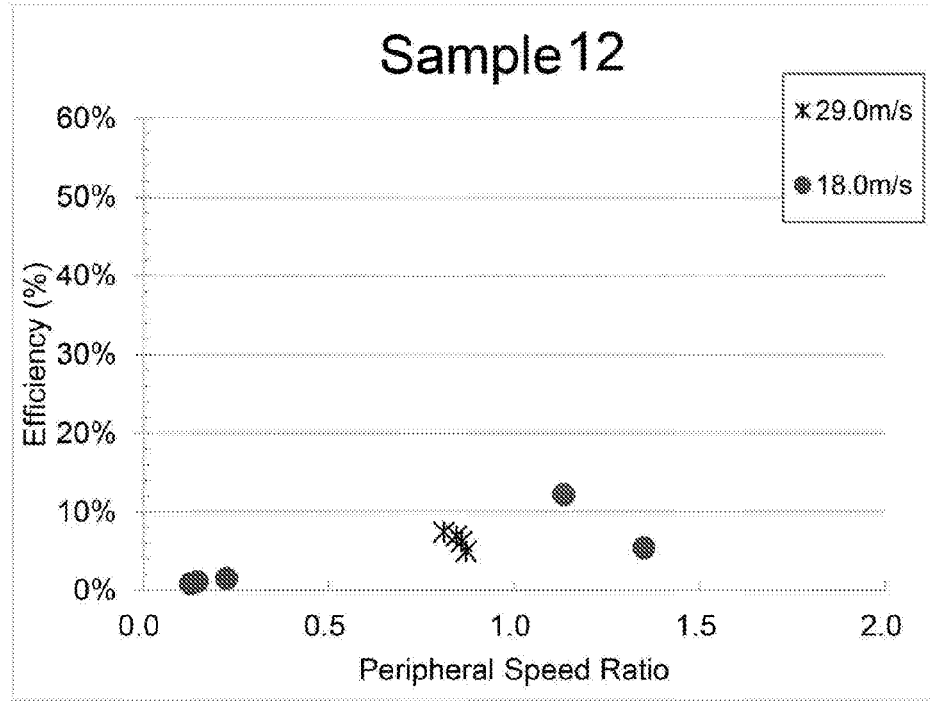
FIG. 18 is a graph showing relationship between efficiency and a peripheral speed ratio of Sample 12 measured in the Experiment 1.

As seen from FIG. 12, the efficiency of Sample 6 came up to 36 or 37% at its maximum, and was 20% or more even at its minimum. In contrast, the efficiency shown in FIG. 16 was only up to 14% at its maximum, and the efficiency shown in FIG. 17 was approximately 4% at its maximum. Similar test was additionally conducted in which the cross-section blockage ratio $S_2/S_1$ was decreased to 0.82 by installing the sail-wing windmill same as Sample 6 in a little larger wind tunnel passage having a diameter of 106 mm. In this case, the efficiency only reached the equivalent level of Sample 10. Based on these observations, it was confirmed that the efficiency is increased with higher cross-section blockage ratio $S_2/S_1$, and is remarkably increased with the cross-section blockage ratio $S_2/S_1$ of 0.9 or more.

Next, to examine effects of the vertical opening ratio $S_3/S_1$ on the efficiency, the measured results were compared between samples with the same windmill type and different vertical opening ratio $S_3/S_1$. More specifically, results of Sample 2 whose vertical opening ratio $S_3/S_1$ is 0.09 and Sample 3 whose vertical opening ratio $S_3/S_1$ is 0.11 (respectively shown in FIG. 8 and FIG. 9) were compared. Windmill type of these samples are the same as "windmill B". These samples are different in the vertical opening ratio $S_3/S_1$. Also, results of Sample 4 whose vertical opening ratio $S_3/S_1$ is 0.08, the Sample 5 whose vertical opening ratio $S_3/S_1$ is 0.11, Sample 6 whose vertical opening ratio $S_3/S_1$ is 0.19 and Sample 7 whose vertical opening ratio $S_3/S_1$ is 0.28 (respectively shown in FIG. 10, FIG. 11, FIG. 12 and FIG. 13) were compared. Windmill type of these samples are the same as "windmill C". These samples are different in the vertical opening ratio $S_3/S_1$. In both cases in which the windmill type is "windmill B" (shown in FIG. 8 and FIG. 9) and is "windmill C" (shown in FIGS. 10 to 13), it was confirmed that a too high vertical opening ratio $S_3/S_1$ and a too low vertical opening ratio $S_3/S_1$ are not preferred in order to achieve higher efficiency on average in wider range of the wind speed, and that higher efficiency is achieved with the samples having vertical opening ratio $S_3/S_1$ of approximately 0.08 to 0.11.

However, it was also confirmed that the efficiency was decreased even with Sample 4 which has low vertical opening ratio $S_3/S_1$ of 0.08 if the wind speed was increased to 29.0 m/s. It was predicted that the low blade displacement ratio W/L of Sample 4 was responsible for the decreased efficiency of Sample 4 under the wind speed of 29.0 m/s, in consideration of facts that; the efficiency of Sample 2, which has the vertical opening ratio $S_3/S_1$ of 0.09 which is close to that of Sample 4, was not decreased when the wind speed was increased to 29.0 m/s; difference of Sample 4 from Sample 2 is the blade displacement ratio W/L; the efficiency of Sample 9, which also has a low blade displacement ratio W/L as with Sample 4, was also decreased when the wind speed was increased to 29.0 m/s. More specifically, it was predicted that increasing the wind speed despite the low blade displacement ratio W/L caused turbulent airflow around the windmill inside the wind tunnel passage, which leaded to decrease of the efficiency. Based on these, it was confirmed that the blade displacement ratio W/L is preferred to be higher than 0.1 in order to secure higher efficiency under high wind speed conditions.

Next, to examine effects of the division number of the windmill on the efficiency of the sail-wing windmills, the measured results of Samples 1 to 9 which have the same cross-section blockage ratio $S_2/S_1$ of 0.96 and different division numbers (respectively shown in FIGS. 7 to 15) were compared. As comparing FIGS. 7 to 15, it was observed that, when the wind speed was 18.0 m/s or less, the efficiency of Samples 2 to 5 (respectively shown in FIGS. 8 to 11), which have relatively lower vertical opening ratio $S_3/S_1$ among Samples 2 to 7 whose division number of the windmill is either six or eight, were roughly higher than that of the other Samples 1,6 to 9 (respectively shown in FIGS. 7 and 12 to 15). It was also observed that the efficiency of windmill of Sample 1 which has relatively small division number of the windmill of four (shown in FIG. 7) reached the maximum if the peripheral speed ratio is higher, whereas the efficiency of windmill of Sample 8 and sample 9 whose division numbers of the windmill are respectively twelve and sixteen (respectively shown in FIG. 14 and FIG. 15) reached the maximum if the peripheral speed ratio is lower. The reason of this tendency was predicted to be as follows: if the division number of the windmill was small, number of gaps between adjacent sailcloth pieces (blades) was also small. This interrupted passage of wind through the windmill. Especially when wind was passing through the windmill less easily due to lower wind speed, turbulent airflow generated on the upwind side of the windmill made the rotational resistance on the windmill be increased. On the other hand, if the division number of the windmill was large, number of gaps between adjacent sailcloth pieces (blades) were also large. This caused many air currents generated on the downwind side of the windmill. Especially when too much wind was passing through the windmill due to higher wind speed, the air currents complicatedly interfered with each other, causing turbulent airflow on the downwind side of the windmill. The turbulent airflow made the rotational resistance on the windmill be increased.

As comparing the results of Samples 1 to 9 which have the same cross-section blockage ratio $S_2/S_1$ of 0.96 (respectively shown in FIGS. 7 to 15), it was also observed that the efficiency of Samples 1 to 3 whose division numbers are around four to six were higher than the efficiency of the samples 4 to 9 whose division numbers are around eight to sixteen when the wind speed was increased to 29.0 m/s. That is to say, smaller division number of the windmill of around four to six serves advantageously when the windmill is used under high wind speed conditions. This tendency is not in conflict with above descripted phenomenon that a too low blade displacement ratio W/L decreases the efficiency under high wind speed conditions. The reason is that, the only way to keep the vertical opening ratio $S_3/S_1$ smaller while securing moderate blade displacement ratio W/L is to keep the division number of the windmill smaller.

From the results of the Experiment 1, it was observed that the windmills (Samples 1 to 9) of the windmill device for power generation of the present invention had much higher efficiency than the Wells turbine (Sample 12), which is generally employed in the OWC wave power generation apparatus, at every wind speed of 14.5 m/s, 18.0 m/s and 29.0 m/s. It was also revealed that relatively lower wind speeds, such as 14.5 m/s or 18.0 m/s, was more preferable than higher wind speeds such as 29.0 m/s to achieve higher efficiency in the windmill device of the present invention. More particularly, it was considered that the windmill device of the present invention is preferred to be used at the wind speed up to 25 m/s, and is further preferred to be used with at wind speed up to 20 m/s. Although lower limit of the wind speed is not particularly limited, it was considered that a too low wind speed cause lower rotational efficiency of the windmill, and therefore that the windmill device of the present invention is preferred to be used with the wind speed of 10 m/s or more, and is further preferred to be used with the wind speed of 12 m/s or more.

EXPERIMENT 2

Finally, Experiment 2 was conducted with Samples 1 to 9 described in Table 1 above to observe a behavior of the windmill of the each Sample in a wind blown from a direction opposite to that of the Experiment 1. As a result, the every windmill of Samples 1 to 9 was confirmed to rotate in the same direction as in the Experiment 1 in spite of the inverted wind direction from that of the Experiment 1.

REFERENCE NUMERALS

10 Wind tunnel member
10*a* One end of the wind tunnel member
10*b* The other end of the wind tunnel member
11 Wind tunnel passage
20 Windmill
21 Hub
22 Spoke(s)
23 Limb
24 Sailcloth piece(s),(blade(s))
30 Output shaft
40 Power converter
60 Rotational output measurement device
90 Resistor

What is claimed is:

1. A windmill device for power generation, the device comprising:
   a wind tunnel member provided with a wind tunnel passage passing a wind therethrough; and
   a windmill held rotatably inside the wind tunnel passage of the wind tunnel member, wherein the windmill includes:
   a hub serving as a rotation center;
   a plurality of spokes extending radially from the hub;
   a limb connecting outer ends of the plurality of spokes, the limb being approximately annular in shape; and
   a plurality of sailcloth pieces, each sailcloth piece being approximately triangular in shape, an outer edge of the sailcloth piece supported by the limb, another one side of the sailcloth piece supported by a spoke of the plurality of spokes, and the other one side of the sailcloth piece left as a free end not supported by any of the spoke and the limb,
   wherein a ratio $S_2/S_1$ is 0.9 to 0.99, where $S_1$ is a cross-sectional area of the wind tunnel passage, and $S_2$ is a wind catching area of the plurality of sailcloth pieces.

2. The device of claim 1, wherein a ratio W/L is 0.3 or less, where W is a maximum vertical displacement of the free end of the sailcloth piece, and L is a length of the spoke.

3. The device of claim 1, wherein a ratio $S_3/S_1$ is 0.05 to 0.3, where $S_3$ is a sum of vertical opening areas of the plurality of sailcloth pieces.

4. The device of claim 1, wherein a cross-section of the wind tunnel passage of the wind tunnel member is circular in shape, the limb is toric in shape, and the each sailcloth piece of the plurality of sailcloth pieces is sectoral in shape.

5. The device of claim 1, wherein the windmill is provided with four or more sailcloth pieces.

6. A power generation apparatus comprising:
   the device of claim 1; and
   a power converter converting rotational energy of the windmill into electric power.

* * * * *